UNITED STATES PATENT OFFICE.

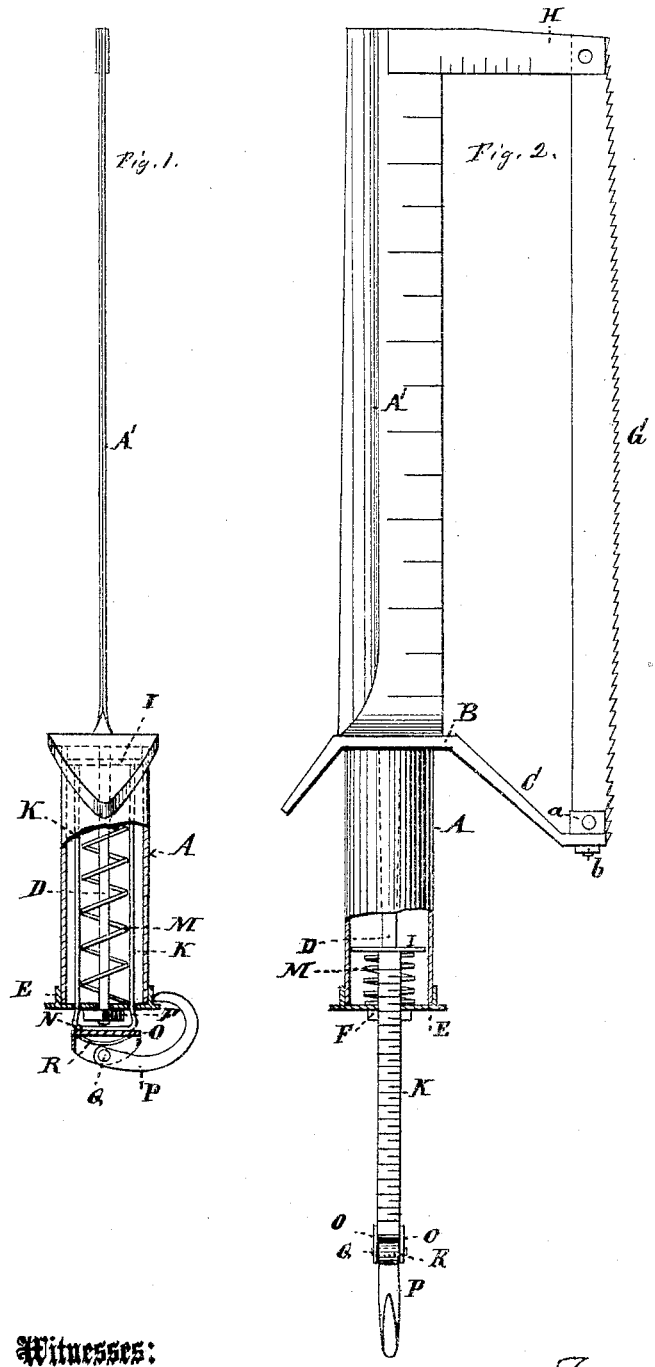

JOHN BAGGS, OF EASTON, MARYLAND.

IMPROVEMENT IN BUTCHERS' COMBINED KNIVES, SAWS, AND SPRING-SCALES.

Specification forming part of Letters Patent No. 138,362, dated April 29, 1873; application filed January 28, 1873.

*To all whom it may concern:*

Be it known that I, JOHN BAGGS, of Easton, in the county of Talbot and State of Maryland, have invented a new and useful Improvement in Butchers' Implement; and I do hereby declare the following to be a full, clear, and exact description of the same, reference being had to the accompanying drawing forming a part of this specification.

This invention has for its object to furnish an improvement adapted especially for butchers' use, which embodies a knife, saw, and spring-balance, so that meat can be sawed, cut, and weighed at one and the same operation without removing the hand from the handle. The invention consists primarily in the combination with a knife, of a separate or independent saw-blade, and a spring-balance inserted into the handle of the knife. The invention further consists in constructing the spring-balance of two graduated scale-plates, which are secured to a disk sliding on the shank of the knife, and between said disk and the cap-plate of the handle is arranged a spiral spring, which is compressed in the weighing operation. The invention also consists in the provision of a suspension-hook, which is pivoted in a socket applied to the sliding index-plates, and combined with a flat spring bearing against the heel-portion of the hook, so as to maintain the same in contact with the handle when not in use.

In the drawing, Figure 1 is a side elevation partly in section of my combined implement, showing the position of the parts in the weighing operation. Fig. 2 is an edge view of the implement partly in section.

The handle A may be constructed of wood or metal, and is made tubular for the reception of a spring-balance. A guard-plate, B, possessing either a straight or rearwardly-projecting arm, C, is formed or detachably secured to the handle. The knife-blade A' is of any preferred form or pattern, and is provided with a square shank, D, which extends through the guard-plate handle, and the cap-plate E applied to the end of the same. The projecting end of the knife-shank is formed with a screw-thread for the application of a fastening-nut, F, serving to secure the handle to the blade. A saw-blade, G, preferably made thicker on its cutting-edge than on its back, to obviate setting, and possessing a slightly-curved cutting-edge to enable it to easily penetrate the substance to be severed, is attached at its rear end to the extension arm of the knife, by means of lateral clamping-plates $a$, and a nut, $b$, applied to a screw-threaded shank of the saw, while the front end of the latter is inserted and secured by rivets or otherwise to a thin plate, H, projecting at an angle to the knife-blade. Within the hollow handle, and sliding on the square shank of the knife, is located a circular disk, I, to which is attached a pair of narrow plates, K, projecting through slots formed in the detachable cap-plate E of the handle, and connected together by a transverse plate, N, formed or attached to the same. A spiral spring, M, located between the movable disk I and cap-plate E, encompasses the shank of the knife for securing the same in position without resorting to fastening-hooks, pins, &c., which generally in ordinary balances weaken the spring. The plates K possess graduations or scale-marks on both sides, so that they may be visible in whatsoever position the implement may be held in the hand. To the upper or transverse connecting-plate N of the index-plate K, are attached ears O, forming a recess or seat for the reception of a curved suspension-hook, P, which turns on a fulcrum-pin, Q, passing through said ears. The heel-portion of the hook bears upon a semi-elliptic or curved spring, R, which has the tendency of maintaining the hook in contact with the handle when turned down, so as not to interfere with the manipulation of the knife and saw. The knife-blade is also provided with a series of graduations indicative of inches, half inches, &c., and, in connection with the bifurcated saw-retaining plate on the front end of the knife, will form a combined square and measure, which, although not used in the vending of meat, does not detract from or interfere with the legitimate operations of the implement.

From the above description it will be perceived that an implement is furnished to be used by butchers and others for cutting, sawing, and weighing meat, which shall be simple in construction and effective in operation, for accomplishing the results stated.

The spring-balance when not in use is entirely inclosed within the handle of the implement, and the suspension-hook rendered susceptible of being placed down with the point in contact with the handle does not interfere with the proper movements of the knife and saw.

The weighing operation is accomplished by turning the hook for suspending the meat in proper relation to the balance, the handle of the implement being retained in the hand, and then by applying the meat to the hook the index-plates are withdrawn from the balance, causing the compression of the spring to the desired degree. The graduations on the index-plates being applied on both sides of the same will permit their inspection in all positions in which the implement is being held, the cap-plate serving as a pointer for indicating the true weight.

The advantages derived by the use of a spring acting by "compression" instead of "expansion," as in balances generally constructed, are manifold, and, for example, I would state that springs acting by expansion become in a comparatively short time, by reason of their expansion, incapable of giving the true weight of the substance to be measured. This defect I obviate by so arranging the spring that the same is compressed in the weighing operation, which has the tendency of maintaining the same in its proper size or shape; but if, by a too prolonged wear, the spring should slightly settle, and thus cause the balance to be below the zero or starting point, it is only necessary to insert a washer corresponding in thickness to suit depression of the indicators below the spring.

Having thus described my invention, what I claim as new, and desire to secure by Letters Patent, is—

1. A butcher's implement, consisting of a knife, A', separate saw-blade G, tubular handle A inclosing a spiral spring, M, disk I, and sliding graduated plates K provided with a suspension-hook, P, as herein shown and described.

2. The pivoted suspension-hook P, arranged as shown, and combined with a spring, R, for the purpose specified.

JOHN BAGGS.

Witnesses:
 THOMAS B. BAGGS,
 PETER STEVENS.